United States Patent [19]

Simons

[11] 4,073,199
[45] Feb. 14, 1978

[54] BREAK-OVER SHIFT LEVER ASSEMBLY

[75] Inventor: Wayne K. Simons, Federal Way, Wash.

[73] Assignee: Paccar Inc, Bellevue, Wash.

[21] Appl. No.: 735,089

[22] Filed: Oct. 22, 1976

[51] Int. Cl.² .............................................. G05G 9/00
[52] U.S. Cl. .............................. 74/473 R; 180/77 TC
[58] Field of Search ......................... 74/473 R, 480 R; 180/77 TC

[56] References Cited

U.S. PATENT DOCUMENTS

| 2,255,643 | 9/1941 | Beimer | 74/473 R |
| 3,329,229 | 7/1967 | Mukho | 74/473 R |

*Primary Examiner*—Edgar W. Geoghegan
*Attorney, Agent, or Firm*—Seed, Berry, Vernon & Baynham

[57] ABSTRACT

A cab-over-engine automotive truck cab is provided with a two-piece transmission shift handle. A telescopic sleeve holds the two shift handle sections together against relative lateral movement and the sleeve can be moved against the pressure of a spring to release the remote section so that it may pivotally break over at an angle to the lower section. In this manner, a slot in the floor of the cab can clear the upper shift handle section whereas without break over the shift handle would not allow adequate clearance with movement of the floor about a forward pivot axis.

3 Claims, 3 Drawing Figures

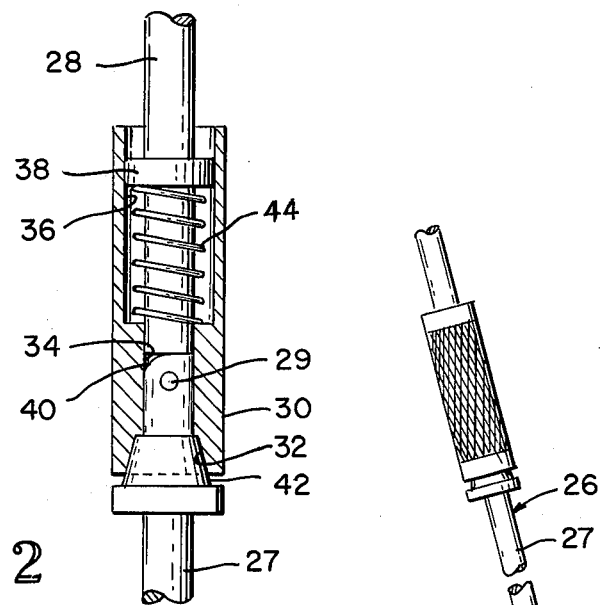
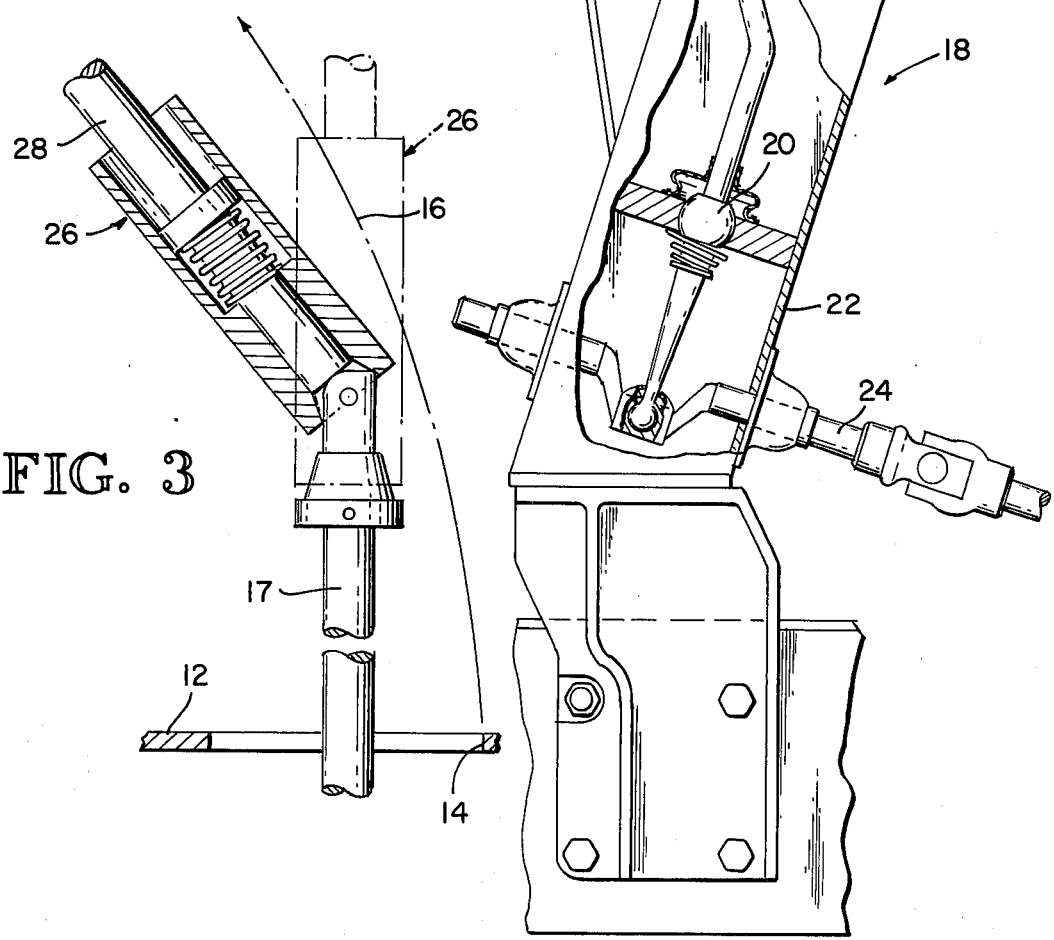

BREAK-OVER SHIFT LEVER ASSEMBLY

BACKGROUND OF THE INVENTION

1. Field of the Invention

This invention pertains to automotive trucks and, more particularly, to a transmission shift handle assembly for an automotive truck of the cab-over-engine type in which the cab, including its floor, swings about a forward pivot axis to expose the engine of the truck.

2. SUMMARY OF THE INVENTION

It is an object of this invention to provide a shift handle assembly for the transmission of a cab-over-engine truck which will allow pivoting movement of the cab without interference with the shift handle.

It is another object of this invention to provide a two-piece transmission shift handle assembly for a cab-over-engine truck which is easily and quickly articulated to avoid interference with the floor of the cab when the cab is swung about a forward pivot axis.

Basically, these objects are obtained by forming the standard transmission shift handle assembly for the cab-over-engine type truck into two articulated pieces or sections with the remote section being releasably locked against lateral movement relative to the inner section by a sleeve which telescopically connects the two sections but which can be swung about a horizontal pivot relative to the inner section by moving the telescopic sleeve.

BRIEF DESCRIPTION OF THE FIGURES OF THE DRAWING

FIG. 1 is a fragmentary schematic illustrating an automotive truck cab with a transmission shift lever assembly embodying the principles of the invention.

FIG. 2 is a detail of a portion of the shift lever assembly.

FIG. 3 is a detail similar to FIG. 2 but showing the shift lever assembly in a second position.

DESCRIPTION OF THE PREFERRED EMBODIMENTS

As best shown in FIG. 1, the typical cab-over-engine truck cab 10 has a floor panel 12 provided with a shift lever slot 14. As is well known in this type of truck, the cab, including its floor panel, is swingable upwardly about an arc 16 around a forward pivot axis not shown. The arc 16, slot 14, and floor panel 12, are not shown to scale but are merely schematic to illustrate the principles of the invention.

The transmission shift lever assembly 18 includes a conventional ball joint 20 housed in a rigid frame 22 and is mounted for universal movement to shift linkages 24 in a conventional manner. The shift linkages, of course, are connected to the transmission of the truck for shifting between gears.

The shift lever assembly is provided with a shift handle 26 formed of a lower or inner section 27 and an upper or remote section 28. The sections are pivotally joined by a roll pin 29. The two sections are locked against relative lateral movement by a sleeve 30 having a chamfered end 32, a first inner bore 34 and a second, larger inner bore 36. The upper lever section 28 is provided with a cylindrical spacer 38 which slidably and snugly fits within the bore 36. The lower section 27 is provided with a cam surface 40 which helps to guide the sleeve over the lower section and a chamfered, cylindrical guide plug 42 which fits within the chamfered end 32 of the sleeve. A spring 44 is provided to normally push the sleeve downwardly over the lower shift section.

As best shown in FIG. 3 in phantom lines, the normal connected position between the two sections 27 and 28 interferes with the wall of the slot as it moves along the arc 16. By lifting the sleeve 30, however, the upper or remote section is free to pivot about the pin 29 into a forward position which allows clearance with the slot. The cam surface 40 holds the sleeve in the break-over position. After the engine work has been completed, the cab is returned to its operating position and the driver need only return the lever to its aligned position over the lower lever section 27 and the sleeve automatically returns into its locking position.

While the preferred embodiment of the invention has been illustrated and described, it should be understood that variations will be apparent to one skilled in the art without departing from the principles herein. Accordingly, the invention is not to be limited to the specific embodiment illustrated in the drawing.

The embodiments of the invention in which a particular property or privilege is claimed are defined as follows:

1. A break-over shift lever assembly for cab-over-engine automotive trucks wherein the entire cab including a floor pivots about a forward pivot axis to expose the engine beneath the cab, comprising:
    a transmission shift assembly having a two-piece shift handle connected below the cab floor to shift linkages and movable between fore and aft and lateral positions to operate the shift linkages,
    said floor having a slot with said shift handle extending upwardly above the slot but in an interference location with the path of the floor as the floor is swung about the forward pivot axis, and
    means for releasibly breaking the two-piece shift handle into an upper lever section and a lower lever section while still connected together with the juncture between the two sections lying below the path of movement of the floor whereby the cab is pivoted over the shift handle.

2. The assembly of claim 1, said releasible breaking means including a sleeve telescopically mounted on one of the shift lever sections and extendable telescopically over the other shift lever section to lock the two sections together against relative lateral movement, means pivotally interconnecting the two sections, means for biasing the sleeve into its locking position and means for guiding said other shift lever section into the sleeve.

3. The assembly of claim 2, said sleeve being telescopically attached to the upper shift lever assembly, said guiding means for said other shift lever assembly including a chamfered plug attached to the lower shift lever section, said sleeve having a lower end with a similarly chamfered end for receiving the plug and cam surfaces on said end of the lower shift lever section for assisting in guiding the plug into the sleeve and for holding the sections in a break-over condition wherein upward movement of the sleeve will break over the shift lever sections and alignment of the sleeve over the lower shift lever section will automatically restore the sleeve to its extended, locking position.

* * * * *